(12) United States Patent
Liu et al.

(10) Patent No.: US 10,872,227 B2
(45) Date of Patent: Dec. 22, 2020

(54) AUTOMATIC OBJECT RECOGNITION METHOD AND SYSTEM THEREOF, SHOPPING DEVICE AND STORAGE MEDIUM

(71) Applicant: BOE TECHNOLOGY GROUP CO., LTD., Beijing (CN)

(72) Inventors: Tong Liu, Beijing (CN); Xiangyang Liu, Beijing (CN); Xiaojun Tang, Beijing (CN); Zhiguo Zhang, Beijing (CN)

(73) Assignee: BOE TECHNOLOGY GROUP CO., LTD., Beijing (CN)

( * ) Notice: Subject to any disclaimer, the term of this patent is extended or adjusted under 35 U.S.C. 154(b) by 74 days.

(21) Appl. No.: 16/114,907

(22) Filed: Aug. 28, 2018

(65) Prior Publication Data

US 2019/0303650 A1 Oct. 3, 2019

(30) Foreign Application Priority Data

Mar. 29, 2018 (CN) .......................... 2018 1 0270142

(51) Int. Cl.
*G06K 9/00* (2006.01)
*G06T 7/38* (2017.01)
(Continued)

(52) U.S. Cl.
CPC .......... *G06K 9/00201* (2013.01); *G06K 9/34* (2013.01); *G06K 9/46* (2013.01); *G06T 7/38* (2017.01); *G06T 7/50* (2017.01)

(58) Field of Classification Search
CPC ........ G06K 9/00201; G06K 9/34; G06K 9/46; G06K 9/6269; G06K 9/6274;
(Continued)

(56) References Cited

U.S. PATENT DOCUMENTS

| 8,401,276 B1* | 3/2013 | Choe ...................... G01C 11/06 382/154 |
| 2005/0168460 A1* | 8/2005 | Razdan .................. G06F 16/904 345/419 |

(Continued)

FOREIGN PATENT DOCUMENTS

| CN | 104715254 A | 6/2015 |
| CN | 105654103 A | 6/2016 |
| CN | 106778810 A | 5/2017 |

OTHER PUBLICATIONS

SVM Understanding; https://blog.csdn.net/viewcode/article/details/12840405; pages downloaded Jan. 14, 2019; 6 pages.
(Continued)

*Primary Examiner* — Asghar H Bilgrami

(57) ABSTRACT

An automatic object recognition method and an automatic object recognition system, a shopping device and a non-transitory computer readable storage medium are disclosed. The automatic object recognition method includes: acquiring a first image and a second image, both the first image and the second image including a same object, and the second image being a depth image; extracting a feature point of the object based on the first image; obtaining a joint feature based on the feature point from the first image and depth information of the second image; and recognizing the object based on the joint feature.

17 Claims, 6 Drawing Sheets

(51) Int. Cl.
*G06T 7/50* (2017.01)
*G06K 9/34* (2006.01)
*G06K 9/46* (2006.01)
*G06T 7/33* (2017.01)

(58) Field of Classification Search
CPC ............... G06K 9/6276; G06K 9/6202; G06K 9/00671; G06T 7/38; G06T 7/50; G06T 7/33; G06T 2207/10024; G06T 2207/10028
See application file for complete search history.

(56) References Cited

U.S. PATENT DOCUMENTS

| 2016/0189419 | A1* | 6/2016 | Fakih ................... G06T 17/005 345/419 |
| 2016/0210602 | A1* | 7/2016 | Siddique ............ G06Q 20/0453 |
| 2017/0278289 | A1* | 9/2017 | Marino .................... G06T 7/44 |
| 2017/0323481 | A1* | 11/2017 | Tran ...................... G06T 19/006 |
| 2019/0149725 | A1* | 5/2019 | Adato ................ H04N 5/23206 348/158 |

OTHER PUBLICATIONS

II. HOG https://blog.csdn.net/yuanlulu/article/details/82148429: 7 pages downloaded Jan. 14, 2019.
[1] SIFT (Scale Invariance Feature Transform) https://www.jianshu.com/p/d94e558ebe26; 4 pages downloaded Jan. 14, 2019.
The First Chinese Office Action dated Apr. 14, 2020; Appln. No. 201810270142.8.

* cited by examiner a first image and a second image, both the first image and the
second image including a same object, and the second image
being a depth image; extracting a feature point of the object
based on the first image; obtaining a joint feature based on
the feature point from the first image and depth information
of the second image; and recognizing the object based on the
joint feature.

For example, in the automatic object recognition method
provided by an embodiment of the present disclosure,
extracting the feature point of the object based on the first
image comprises: acquiring a target region of the first image,
the target region comprising the object; and extracting the
feature point of the object within the target region.

For example, in the automatic object recognition method
provided by an embodiment of the present disclosure,
acquiring the target region of the first image comprises:
performing image segmentation processing on the first
image to obtain the target region of the first image; or
performing image segmentation processing on the second
image to obtain a depth target region of the second image,
performing a registration operation on the first image and the
second image to obtain registration information between the
first image and the second image, and obtaining the target
region of the first image based on the registration information and the depth target region.

For example, in the automatic object recognition method
provided by an embodiment of the present disclosure,
obtaining the joint feature based on the feature point from
the first image and depth information of the second image
comprises: computing a three-dimensional feature corresponding to the feature point based on the feature point and
the depth information of the second image; and merging the
three-dimensional feature and the feature point to obtain the
joint feature.

For example, in the automatic object recognition method
provided by an embodiment of the present disclosure, computing the three-dimensional feature corresponding to the
feature point based on the feature point and the depth
information of the second image comprises: establishing a
three-dimensional coordinate system of the feature point
based on the feature point and the depth information of the
second image; and computing the three-dimensional feature
corresponding to the feature point according to the three-dimensional coordinate system of the feature point.

For example, in the automatic object recognition method
provided by an embodiment of the present disclosure, establishing the three-dimensional coordinate system of the feature point based on the feature point and the depth information of the second image comprises: performing a
registration operation on the first image and the second
image to obtain registration information between the first
image and the second image, the registration information
including the depth information of the second image; determining a feature surface of the object according to the
feature point; computing three-dimensional information of
feature description points of the feature surface based on the
registration information; and establishing the three-dimensional coordinate system of the feature point based on the
three-dimensional information of the feature description
points and the feature point.

For example, in the automatic object recognition method
provided by an embodiment of the present disclosure, establishing the three-dimensional coordinate system of the feature point based on the three-dimensional information of the
feature description points and the feature point includes:
computing a normal vector at the feature point according to
the three-dimensional information of the feature description
points, a direction of the normal vector being taken as a
first-axis direction of the three-dimensional coordinate system; and obtaining, according to the normal vector, a tangent
plane at the feature point and principal directions of two
principal curvatures of the feature point on the tangent plane,
the principal directions of the two principal curvatures being
perpendicular to each other, and the principal directions of
the two principal curvatures being respectively taken as a
second-axis direction and a third-axis direction of the three-dimensional coordinate system.

For example, in the automatic object recognition method
provided by an embodiment of the present disclosure, computing the three-dimensional feature corresponding to the
feature point according to the three-dimensional coordinate
system of the feature point includes: computing coordinates
of the feature description points of the feature surface in the
three-dimensional coordinate system; and computing the
three-dimensional feature corresponding to the feature point
according to a coordinate of the feature point in the three-dimensional coordinate system and the coordinates of the
feature description points in the three-dimensional coordinate system.

For example, in the automatic object recognition method
provided by an embodiment of the present disclosure, merging the three-dimensional feature and the feature point to
obtain the joint feature includes: merging a dimension of the three-dimensional feature and a dimension of the feature point to obtain the joint feature.

For example, in the automatic object recognition method provided by an embodiment of the present disclosure, recognizing the object based on the joint feature includes: using a classifier to compute based on the joint feature, a plurality of scores when the object belongs to different categories; and determining a recognition result of the object according to the plurality of scores.

For example, the automatic object recognition method provided by an embodiment of the present disclosure further comprises: outputting the recognition result of the object.

For example, in the automatic object recognition method provided by an embodiment of the present disclosure, the first image is a color image.

An embodiment of the present disclosure further discloses an automatic object recognition system, comprising: an image acquisition module, configured to acquire a first image and a second image, both the first image and the second image including a same object, and the second image being a depth image; a feature extraction module, configured to extract a feature point of the object based on the first image; a feature joint module, configured to obtain a joint feature based on the feature point from the first image and depth information of the second image; and a recognition module, configured to recognize the object based on the joint feature.

For example, in the automatic object recognition system provided by an embodiment of the present disclosure, an operation of extracting the feature point of the object based on the first image includes: acquiring a target region of the first image, the target region including the object; and extracting the feature point of the object within the target region.

For example, in the automatic object recognition system provided by an embodiment of the present disclosure, an operation of obtaining the joint feature based on the feature point from the first image and depth information of the second image includes: computing a three-dimensional feature corresponding to the feature point based on the feature point and the depth information of the second image; and merging the three-dimensional feature and the feature point to obtain the joint feature.

An embodiment of the present disclosure further discloses an automatic object recognition system, comprising: an image acquisition device, configured to acquire a first image and a second image, both the first image and the second image including a same object, and the second image being a depth image; a non-transitory memory, configured to store computer readable instructions; and a processor, configured to execute the computer readable instructions, and when the computer readable instructions are executed by the processor, the automatic object recognition method according to any one of the above embodiments is performed.

For example, in the automatic object recognition system provided by an embodiment of the present disclosure, the image acquisition device includes a depth camera.

For example, the automatic object recognition system provided by an embodiment of the present disclosure further comprises an output device, and the output device is configured to output a recognition result of the object.

An embodiment of the present disclosure further discloses a shopping device, comprising a loading region and the automatic object recognition system according to any one of the above embodiments, and the automatic object recognition system is provided on the loading region.

An embodiment of the present disclosure further discloses a non-transitory computer readable storage medium, for storing computer readable instructions, when the computer readable instructions are executed by a computer, the automatic object recognition method according to any one of the above embodiments is performed.

BRIEF DESCRIPTION OF THE DRAWINGS

In order to clearly illustrate the technical solutions of the embodiments of the disclosure, the drawings of the embodiments will be briefly described in the following; it is obvious that the described drawings are only related to some embodiments of the disclosure and thus are not (imitative to the disclosure.

DETAILED DESCRIPTION

Figure 1A:
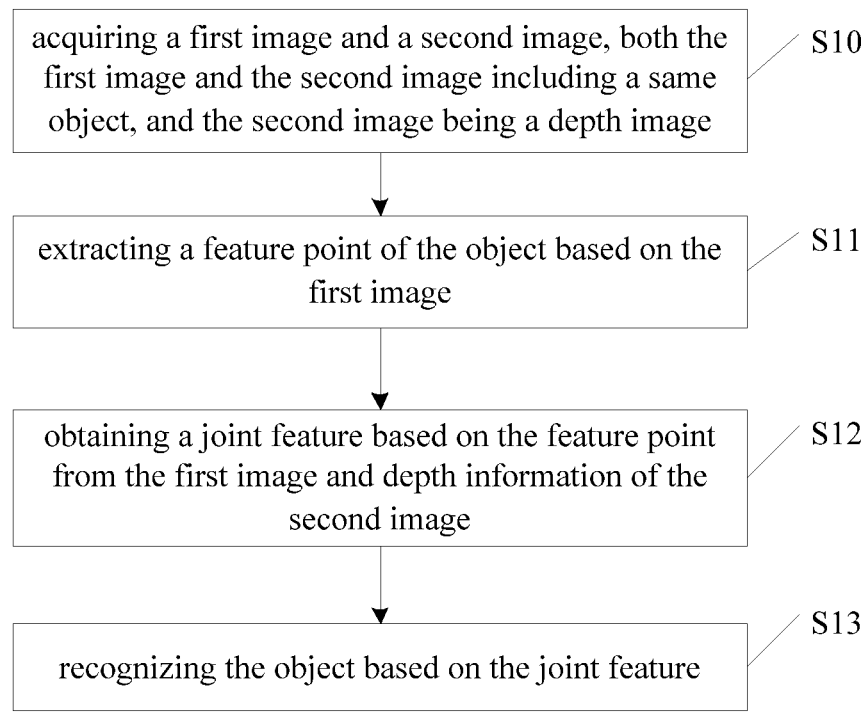
FIG. 1A is a schematic flow chart of an automatic object recognition method provided by an embodiment of the present disclosure.

In order to make objects, technical details and advantages of the embodiments of the disclosure apparent, the technical solutions of the embodiments will be described in a clearly and fully understandable way in connection with the drawings related to the embodiments of the disclosure. Apparently, the described embodiments are just a part but not all of the embodiments of the disclosure. Based on the described embodiments herein, those skilled in the art can obtain other embodiment(s), without any inventive work, which should be within the scope of the disclosure.

Unless otherwise defined, all the technical and scientific terms used herein have the same meanings as commonly understood by one of ordinary skill in the art to which the present disclosure belongs. The terms "first," "second," etc which are used in the present disclosure, are not intended to indicate any sequence, amount or importance, but distinguish various components. The terms "comprise," "comprising," "include," "including," etc., are intended to specify that the elements or the objects stated before these terms encompass the elements or the objects and equivalents thereof listed after these terms, but do not preclude the other elements or objects. The phrases "connect", "connected", etc., are not intended to define a physical connection or mechanical connection, but may include an electrical connection, directly or indirectly. "On," "under," "right," "left" and the like are only used to indicate relative position relationship, and when the position of the object which is described is changed, the relative position relationship may be changed accordingly.

In order to make the following descriptions of the embodiments of the present disclosure clear and concise, the present disclosure omits detailed descriptions of known functions and known components.

A method for recognizing an object based on an image of the object may comprise: acquiring a color image of the object; performing image segmentation on the color image of the object to obtain a segmentation region; extracting an image feature of the object based on the segmentation region; and recognizing the object based on the image feature of the object; and determining a category of the object according to a recognition result.

At present, in an automatic object recognition technology, a recognition method based on the image of the object has many problems, for example, due to changes in illumination, viewing angle, noise, and other factors, images of objects of a same category change greatly; similarity between objects of different categories is large, that is, the objects of different categories, for example, instant noodles of different brands, beverages of different brands, and the like, have similar appearance; computational complexity is large, although deep learning and the like have achieved relatively high accuracy in a field of object categorization, yet algorithm complexity of deep learning is very complicated, such that hardware costs are increased. At the same time, the computation amount of deep learning is relatively large, thus it is very difficult for deep learning to implement an operation process in real-time at the terminal. If simple barcode recognition is used as an automatic commodity recognition technology, then a user needs to cooperate to perform a code scanning operation, which results in a poor user experience.

Embodiments of the present disclosure provide an automatic object recognition method, an automatic object recognition system, a shopping device and a non-transitory computer readable storage medium, by combining depth information of a depth image of an object with an image feature point of a color or gray-scale image, a joint feature that expresses richer information of the object is constructed, and then object recognition is performed based on the joint feature, thus computational complexity can be reduced, an operational pressure of a server can be reduced, a computation speed can be increased; in addition, local operations can be implemented without increasing hardware costs; and on the other hand, object recognition is performed based on the joint feature, which May also enhance reliability of the object recognition, improve accuracy of the object recognition, and implement accurate object recognition in complex scenes.

Several embodiments of the present disclosure are described in details below with reference to the accompanying drawings, but the present disclosure is not limited to these specific embodiments.

Figure 1B:
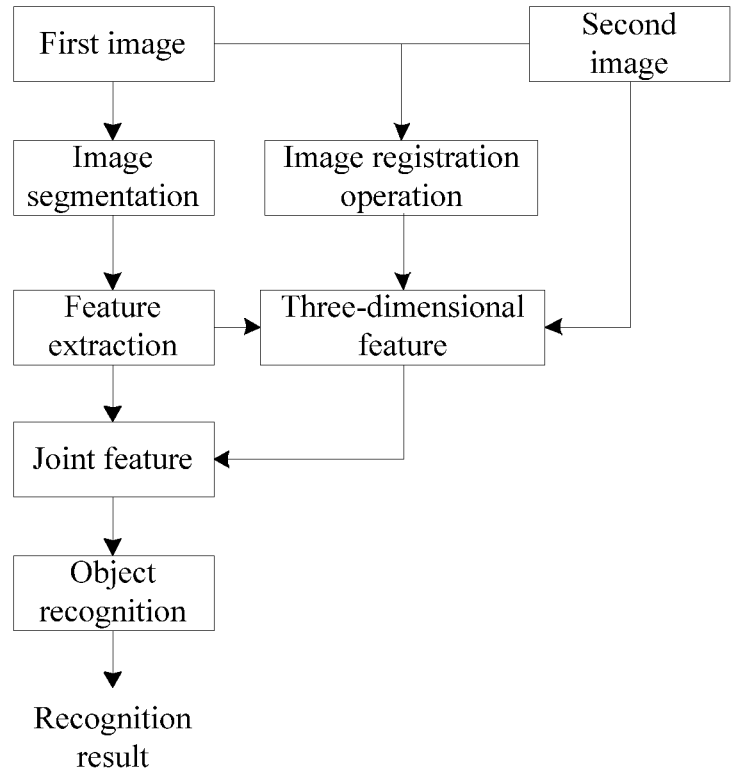
FIG. 1B is a specific flow chart of an automatic object recognition method provided by an embodiment of the present disclosure.

FIG. 1A is a schematic flow chart of an automatic object recognition method provided by an embodiment of the present disclosure, FIG. 1B is a specific flow chart of an automatic object recognition method provided by an embodiment of the present disclosure.

For example, as shown in FIG. 1A, the automatic object recognition method provided by the embodiment of the present disclosure may comprise following steps:

S10: acquiring a first image and a second image, both the first image and the second image including a same object, and the second image being a depth image;

S11: extracting a feature point of the object based on the first image;

S12: obtaining a joint feature based on the feature point from the first image and depth information of the second image;

S13: recognizing the object based on the joint feature.

In the automatic object recognition method provided by the embodiment of the present disclosure, the depth information of the depth image of the object may be combined with an image feature (for example, the feature point) of the color or gray-scale image to construct the joint feature that expresses richer information of the object, and then object recognition is performed based on the joint feature, that is to say, in the automatic object recognition method provided by the present disclosure, only the depth information of the object and the image feature (for example, the feature point) need to be extracted, so as to obtain the joint feature, and then the object is recognized based on the joint feature, computational complexity of the server is relatively small, thereby, the operational pressure of the server may be lowered, the computation speed is increased, and local operations may be implemented without increasing hardware costs; and on the other hand, object recognition is performed based on the joint feature, which may enhance reliability of the object recognition, improve accuracy of the object recognition, and implement accurate object recognition in complex scenes.

For example, as shown in FIG. 1B, an overall process of the automatic object recognition method may include: firstly, acquiring the first image and the second image, the second image being the depth image; then, performing image segmentation processing on the first image to obtain a target region of the first image; then, extracting the feature point of the object based on the target region; then, performing an image registration operation on the first image and the second image to obtain registration information between the first image and the second image; next, computing a three-dimensional feature of the object based on the feature point of the object, the registration information and the second image; next, merging the three-dimensional feature and the feature point of the object to obtain the joint feature of the object; and finally, recognizing the object based on the joint feature of the object, and determining a category of the object according to a recognition result.

For example, in the step S10, both the first image and the second image may be obtained by an image acquisition device, and thus, the image acquisition device may include a depth camera, and the depth camera is configured to acquire a depth image (i.e., the second image). Of course, the image acquisition device may further include other types of cameras.

For example, the first image and the second image may be original images directly acquired by the image acquisition device, and may also be images obtained after preprocessing the original images.

For example, in the step S10, the first image and the second image are images acquired by shooting the same object through the image acquisition device, thus the first image and the second image both comprise the same object. For example, in an example, if the first image comprises a basketball, then the second image also comprises the basketball.

For example, the first image and the second image have the same size.

For example, a method of acquiring the second image may include passive ranging sensing, active depth sensing, and the like. A method of the passive ranging sensing includes a binocular stereo vision method; and a method of the active depth sensing mainly includes Time-of-flight (TOF), structured light, laser scanning, and the like.

For example, the first image may be a color image, and may also be a gray-scale image.

For example, the number of first images and the number of second images may be preset and equal. For example, a plurality of first images may be acquired from different shooting angles, and correspondingly, a plurality of second images may also be acquired from different shooting angles, and the plurality of first images and the plurality of second images are in one-to-one correspondence.

For example, the step S11 may include:

S111: acquiring a target region of the first image, the target region including the object;

S112: extracting the feature point of the object within the target region.

For example, a shape of the target region is similar to an outline of the object, and at this time, the shape of the target region may be an irregular shape. However, the present disclosure is not limited thereto, the shape of the target region may be a regular shape, such as a rectangle, a circle, and the like; and at this time, a size of the target region is larger than a size of the object, and the object completely falls within the target region.

For example, the size of the target region is not larger than a size of the first image. The object may be completely in the first image, that is, the first image may include overall information of the object, such as an overall shape, and the like. Alternatively, the first image comprises only a portion of the object. The present disclosure is not limited thereto.

For example, in some embodiments of the present disclosure, because the size of the target region is not larger than the size of the first image and the feature point of the object only need to be extracted within the target region, the computational complexity may be further reduced, and the computation speed is increased.

For example, the step S111 may include: performing image segmentation processing on the first image to obtain the target region of the first image. Alternatively, the step S111 may also include: performing image segmentation processing on the second image to obtain a depth target region of the second image; performing a registration operation on the first image and the second image to obtain registration information between the first image and the second image; and obtaining the target region of the first image based on the registration information and the depth target region.

For example, methods for performing image segmentation on the first image may include a region-based segmentation method, an edge-based segmentation method, a threshold-based segmentation method, a specific-theory-based segmentation method, an artificial neural network based segmentation method, and a random field theory based segmentation method, and the like.

For example, methods for performing image segmentation on the second image may include a depth information based segmentation method, and the like. For example, in one example, a depth image may be acquired by using structured light, and in the depth image, a gray-scale value of each pixel point represents a distance between the image acquisition device and the object; because edges of the object is unable to reflect the structured light, gray-scale values of pixel points corresponding to the edges of the object are 0. Therefore, the second image may be segmented based on the gray-scale values of the pixel points in the depth image, so as to obtain the depth target region of the second image.

For example, the registration information between the first image and the second image includes a pixel correspondence relationship between the first image and the second image. In one example, the first image and the second image may be simultaneously acquired by the same image acquisition device, such that the first image and the second image are registered with each other, i.e., the image acquisition device may perform the registration operation on the first image and the second image. Thus, the registration information between the first image and the second image may be obtained from the image acquisition device, that is to say, when the image acquisition device outputs the first image and the second image, the registration information between the first image and the second image may be output simultaneously. Because the first image and the second image are simultaneously acquired by the same image acquisition device, the depth target region of the second image and the target region of the first image correspond to each other, thus the target region of the first image may be obtained based on the registration information and the depth target region.

For example, in the step S112, because the size of the target region is not larger than the size of the first image, performing the operation of extracting the feature point of the object in the target region can reduce computational complexity and increase the computation speed. According to algorithms for extracting the feature point, types of the feature point of the object may include a Scale Invariant Feature Transform (SIFT) feature, an Oriented FAST and Rotated BRIEF (ORB) feature, a Speeded Up Robust Feature (SURF), a Local Binary Pattern (LBP) feature, and a Histogram of Oriented Gradient (HOG) feature, and the like. For example, the SIFT feature and the ORB feature, etc., are directional features, and the HOG feature and the LBP feature, etc., are non-directional features. According to a property of the feature point, types of the feature point may include a texture feature, a color feature, and a shape feature, etc., of the image.

For example, in the step S112, various types of multiple feature points of an image may be extracted.

For example, the step S12 may include following steps:

S121: computing a three-dimensional feature corresponding to the feature point based on the feature point and the depth information of the second image;

S122: merging the three-dimensional feature and the feature point to obtain the joint feature.

For example, the depth information of the second image may include a distance between each point on the object and the image acquisition device.

For example, the step S121 may include: establishing a three-dimensional coordinate system of the feature point based on the feature point and the depth information of the second image; and computing the three-dimensional feature corresponding to the feature point according to the three-dimensional coordinate system of the feature point.

For example, establishing the three-dimensional coordinate system of the feature point based on the feature point and the depth information of the second image includes: performing the registration operation on the first image and the second image to obtain the registration information between the first image and the second image, the registration information including the depth information of the second image; determining a feature surface of the object according to the feature point; computing three-dimensional information of feature description points of the feature surface based on the registration information; and establishing the three-dimensional coordinate system of the feature point based on the three-dimensional information of the feature description points and the feature point.

For example, the feature surface of the object may be preset as needed. For example, the feature surface of the object may be a region close to the feature point, such as a region having a size of 7 (pixel points)×7 (pixel points) close to the feature point. The feature description points of the feature surface may be respective pixel points of the feature surface, for example, the number of feature description points of the feature surface is 48 (i.e., 7×7−1=48, where, subtracting 1 denotes that the feature point is not included within the number of feature description points of the feature surface).

For example, the feature point may be located at a center of the feature surface corresponding to the feature point.

For example, sizes of feature surfaces of respective feature points may be the same, and also may be different, which is not limited in the present disclosure.

For example, the three-dimensional information of the feature description points of the feature surface may be computed according to a principle of transforming a depth map into point cloud, and specific description is as follows.

Figure 2:
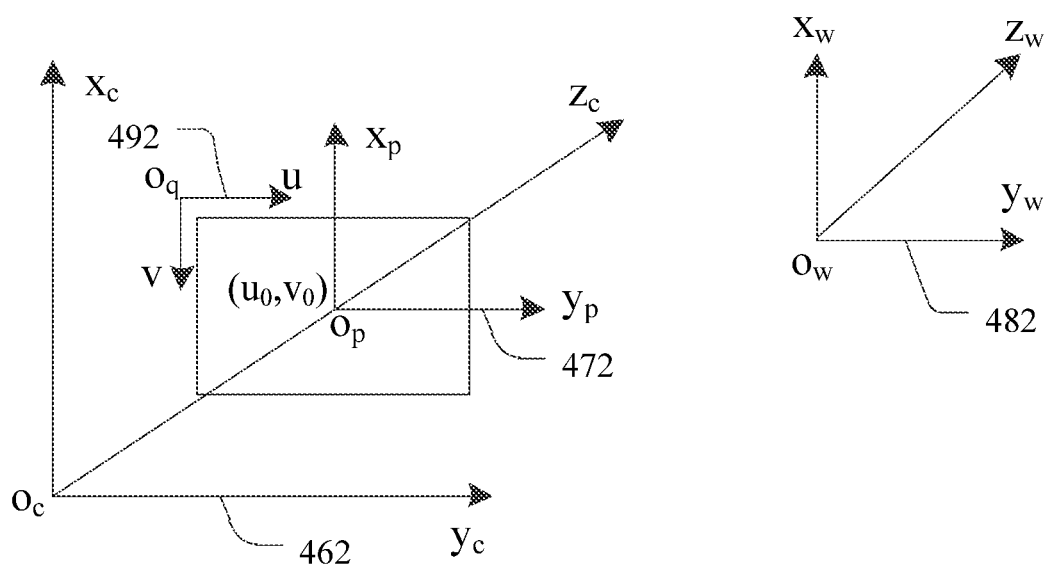
FIG. 2 is a schematic diagram of a coordinate system of a video camera calibration model.

FIG. 2 is a schematic diagram of a coordinate system of a video camera calibration model. For example, in video camera calibration, an object in space is restored by using an image captured by a video camera. A pinhole model may be used for the video camera calibration. As shown in FIG. 2, in the video camera calibration model, a video camera coordinate system 462 (i.e., an $o_c$-$x_c y_c z_c$ coordinate system) is a coordinate system established with the video camera as a benchmark. An image coordinate system 472 (i.e., an $o_p$-$x_p y_p$ coordinate system) is a coordinate system established with an optical image (i.e., the first image) of the object captured by the video camera as a benchmark. A world coordinate system 482 (i.e., an $o_w$-$x_w y_w z_w$ coordinate system) is a coordinate system established with the object as a benchmark. A coordinate system 492 (i.e., an $o_q$-uv coordinate system) is a pixel coordinate system of the optical image (i.e., the first image). The world coordinate system 482 may be freely placed according to operational needs. An origin $o_c$ of the video camera coordinate system 462 may be located on an optical center (i.e., a projection center) of the video camera, and an origin $o_p$ of the image coordinate system 472 may be located at an intersection ($u_0$, $v_0$) of an optical axis of the video camera and an imaging plane. A $z_c$ axis of the camera coordinate system 462 is the optical axis of the video camera, and an $x_c$ axis and a $y_c$ axis of the video camera coordinate system 462 are respectively parallel to an $x_p$ axis and a $y_p$ axis of the image coordinate system 472. The $x_p$ axis and the $y_p$ axis of the image coordinate system 472 are also respectively parallel to a u axis and a v axis of the pixel coordinate system 492. A pixel coordinate (u, v) of each point in the pixel coordinate system 492 represent the number of columns and the number of rows of a pixel, and may be obtained from the video camera.

For example, during a process of coordinate transformation, the optical image in the image coordinate system 472 needs to be firstly transformed into an image in the video camera coordinate system 462, and then be transformed into an image in the world coordinate system 482. Thus, each point in the optical image may correspond to a corresponding point in the world coordinate system 482. The image coordinate system 472 and the video camera coordinate system 462 are mutually transformed by perspective projection, and the video camera coordinate system 462 and the world coordinate system 482 are mutually transformed by rigid body changes (rotation and translation).

For example, the image coordinate system 472 and the pixel coordinate system 492 are two-dimensional coordinate systems, and the video camera coordinate system 462 and the world coordinate system 482 are three-dimensional coordinate systems.

For example, in the embodiment of the present disclosure, the three-dimensional information of the feature description points may represent coordinate information of the feature description points in the world coordinate system 482. The three-dimensional information of a feature description point may be expressed as follows:

$$z_c \begin{pmatrix} u \\ v \\ 1 \end{pmatrix} = \begin{bmatrix} f/\Delta x & 0 & u_0 \\ 0 & f/\Delta y & v_0 \\ 0 & 0 & 1 \end{bmatrix} [R\ T] \begin{bmatrix} x_w \\ y_w \\ z_w \\ 1 \end{bmatrix} \quad (1)$$

Where, (u, v) represents a coordinate of the feature description point under the pixel coordinate system 492, that is, a pixel coordinate of the feature description point on the first image; ($u_0$, $v_0$) is a coordinate of a center point of the first image, ($x_w$, $y_w$, $z_w$) represents a coordinate of the feature description point under the world coordinate system 482, that is, the three-dimensional information of the feature description point, $z_c$ represents a distance from the feature description point to the video camera, R and T are respectively a 3×3 rotation matrix and a 3×1 translation matrix of an external parameter matrix, f is a focal length of the video camera, and $\Delta x$ and $\Delta y$ are respectively physical sizes of a pixel point of the first image in the image coordinate system 472 in an x-axis direction and a y-axis direction.

For example, if a coordinate origin of the world coordinate system 482 coincides with a coordinate origin of the video camera coordinate system 462, then the world coordinate system 482 and the video camera coordinate system 462 do not have rotation or translation there between. Therefore:

$$R = \begin{bmatrix} 0 & 0 & 0 \\ 0 & 1 & 0 \\ 0 & 0 & 1 \end{bmatrix}, T = \begin{bmatrix} 0 \\ 0 \\ 0 \end{bmatrix}$$

It is worth noting that, because the coordinate origin of the world coordinate system 482 coincides with the coordinate origin of the video camera coordinate system 462, the same object has the same depth, i.e., $z_c$=$z_w$, under the world coordinate system 482 and the video camera coordinate system 462. $Z_c$ is the depth information of the feature description point, and $z_c$ may be obtained from the second image.

In summary, coordinates of the feature description points in the world coordinate system 482 may be obtained by solving the above-described equation (1). Three coordinate values of the feature description point having the pixel coordinate of (u, v) in the world coordinate system 482 are respectively: $x_w$=$z_c$·(u−$u_0$)·dx/f, $y_w$=$z_c$·(v−$v_0$)·dy/f, $z_w$=$z_c$. Thus, the three-dimensional information of the feature description point having the pixel coordinate of (u, v) is ($z_c$·(u−$u_0$)·dx/f, $z_c$·(v−$v_0$)·dy/f, $z_c$).

For example, establishing the three-dimensional coordinate system of the feature point based on the three-dimensional information of the feature description points and the feature point may include: computing a normal vector at the feature point according to the three-dimensional information of the feature description points, a direction of the normal vector being taken as a first-axis direction of the three-dimensional coordinate system; obtaining, according to the normal vector, a tangent plane at the feature point and principal directions of two principal curvatures of the feature point on the tangent plane, and the principal directions of the two principal curvatures being respectively taken as a second-axis direction and a third-axis direction of the three-dimensional coordinate system.

For example, three-dimensional coordinate systems of respective feature points of the object are different from one another. In the three-dimensional coordinate system of the feature point, the feature point may be the coordinate origin of the three-dimensional coordinate system.

Figure 3:
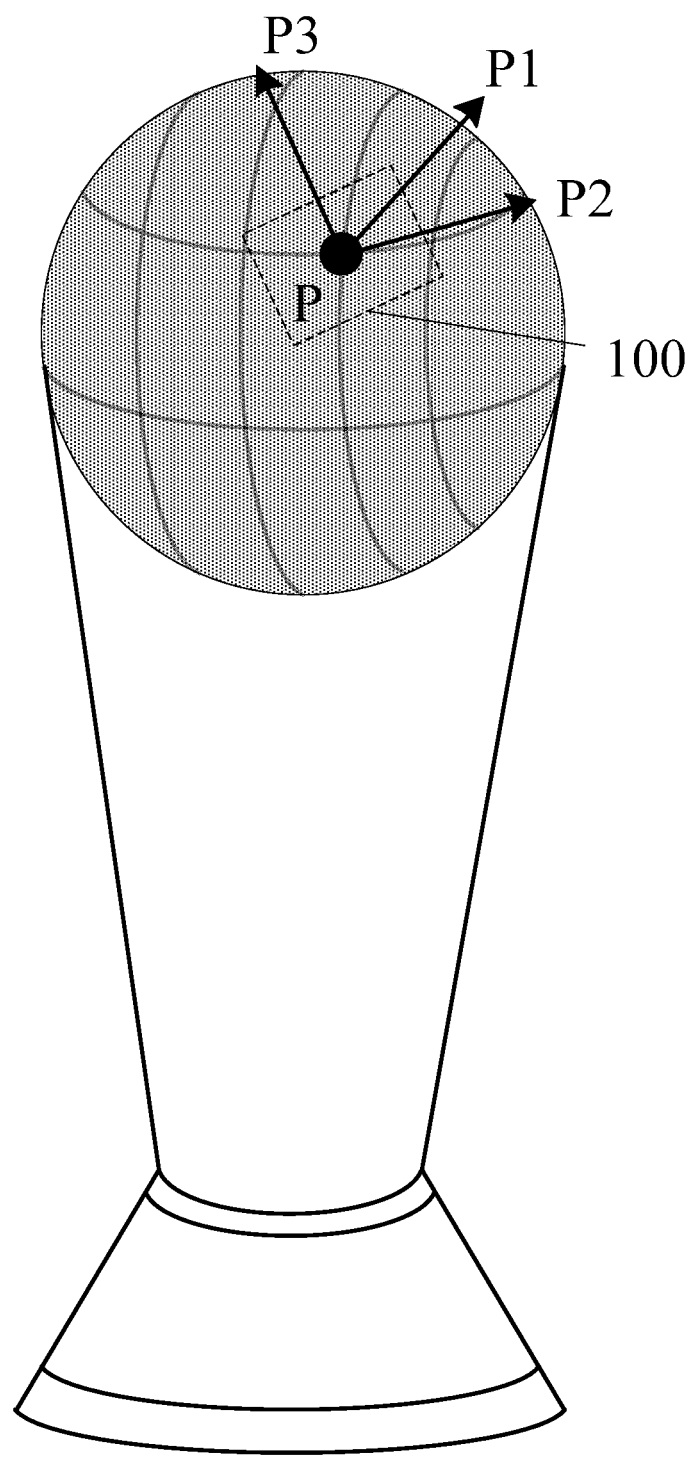
FIG. 3 is a schematic diagram of a three-dimensional coordinate system at a feature point of an object provided by an embodiment of the present disclosure.

FIG. 3 is a schematic diagram of a three-dimensional coordinate system at a feature point of an object provided by an embodiment of the present disclosure. For example, as shown in FIG. 3, in a local three-dimensional coordinate system established at a feature point P, the feature point P is a coordinate origin of the local three-dimensional coordinate system, a first axis direction P1 is a Z-axis direction of the local three-dimensional coordinate system, and a second-axis direction P2 and a third-axis direction P3 are respectively an X-axis direction and a Y-axis direction of the local three-dimensional coordinate system.

For example, computing the normal vector at the feature point according to the three-dimensional information of the feature description points, may include: by using curved planar reconstruction technology based on a Point cloud Library (PCL), reconstructing a point cloud surface corresponding to respective feature description points according to the respective feature description points; and then, computing, according to the point cloud surface, the normal vector of the point cloud surface at the feature point.

For example, PCL-based curved planar reconstruction algorithms may include Poisson surface reconstruction, greedy projection triangulation, marching cubes, and other algorithms.

For example, a normal line of the point cloud surface is defined as a vector that is perpendicular to a plane tangent to the point cloud surface. The normal vector of the feature surface at the feature point may be perpendicular to a plane that is tangential to the point cloud surface and comprises the feature point.

For example, the principal directions of the two principal curvatures are perpendicular to each other, and the two principal curvatures are respectively a maximum principal curvature and a minimum principal curvature. For example, the second-axis direction may be a principal direction of the maximum principal curvature, and the third-axis direction may be a principal direction of the minimum principal curvature. However, the present disclosure is not limited thereto, the second-axis direction may also be the principal direction of the minimum principal curvature, and the third-axis direction may be the principal direction of the maximum principal curvature.

For example, the tangent plane at the feature point may represent a tangent plane of the point cloud surface constructed according to the feature description points at the feature point.

For example, computing the three-dimensional feature corresponding to the feature point according to the three-dimensional coordinate system of the feature point includes: computing coordinates of the feature description points of the feature surface in the three-dimensional coordinate system; and computing the three-dimensional feature corresponding to the feature point according to a coordinate of the feature point in the three-dimensional coordinate system and the coordinates of the feature description points in the three-dimensional coordinate system.

For example, the three-dimensional feature corresponding to the feature point may include a surface shape feature descriptor, a 3D shape context feature descriptor, and other descriptors. For example, the surface shape feature descriptor may be differences between the coordinates of respective feature description points on the feature surface in the three-dimensional coordinate system and the coordinate of the feature point in the three-dimensional coordinate system. When the feature point is the coordinate origin of the three-dimensional coordinate system, the surface shape feature descriptor may be coordinate values of the respective feature description points on the feature surface in the three-dimensional coordinate system.

For example, the three-dimensional feature corresponding to the feature point may represent a relative positional relationship between the feature point and the respective feature description points. When the object is located in different positions, all the feature points are the same, and all the three-dimensional features corresponding to the feature points are also the same. In addition, the feature points computed according to the first image and the second image captured at different times are also the same, and the three-dimensional features corresponding to the feature points computed according to the first image and the second image captured at different times are also the same.

For example, the step S122 may include: merging a dimension of the three-dimensional feature and a dimension of the feature point to obtain the joint feature.

For example, the joint feature represents a combination of the feature point (i.e., a feature of a two-dimensional image) of the object and the three-dimensional feature (i.e., a three-dimensional image feature) of the object. The feature point, the three-dimensional feature and the joint feature of the object may all be represented as vectors. Respective elements in the joint feature may be respective elements in the feature point of the object and respective elements in the three-dimensional feature, and a dimension of the joint feature is a sum of the dimension of the feature point of the object and the dimension of the three-dimensional feature. As shown in FIG. 3, in one example, if a dimension of the feature point P is M, and the feature point P may be expressed as $\vec{P}=[P1, P2, \ldots PM]$. A feature surface 100 of the feature point P may include N1 feature description points; because a dimension of each feature description point is N2, a dimension of a three-dimensional feature corresponding to the feature point P is N1×N2, and the three-dimensional feature may be expressed as $\vec{Q}=[Q1, Q2, \ldots, QN]$, where, N=N1×N2. Thus, in some embodiments, for the feature point P, a joint feature of the feature point P may be expressed as $\vec{R}=[P1, P2, \ldots, PM, Q1, Q2, \ldots QN]$, and a dimension of the joint feature is N1×N2. In other embodiments, weights W1 and W2 may be respectively assigned to vectors $\vec{P}$ and $\vec{Q}$, and W1 and W2 satisfy a relational expression: W1+W2=1. The joint feature may be expressed as:

$$\vec{R}=[W1*P1, W1*P2, \ldots, W1*PM, W2*Q1, W2*Q2, \ldots, W2*QN]$$

For example, in practical applications, values of W1 and W2 may be selected according to a recognition effect of the object in a testing procedure. For example, W1 may be 0.1, 0.2, . . . 0.9, and accordingly, W2 may be 0.9, 0.8, . . . , 0.1. Respectively based on joint features obtained according to the nine sets of values of W1 and W2, the object is recognized, recognition rates in the testing procedure are calculated, and a set of values corresponding to a highest recognition rate is selected and taken as the final weights W1 and W2.

Figure 4:
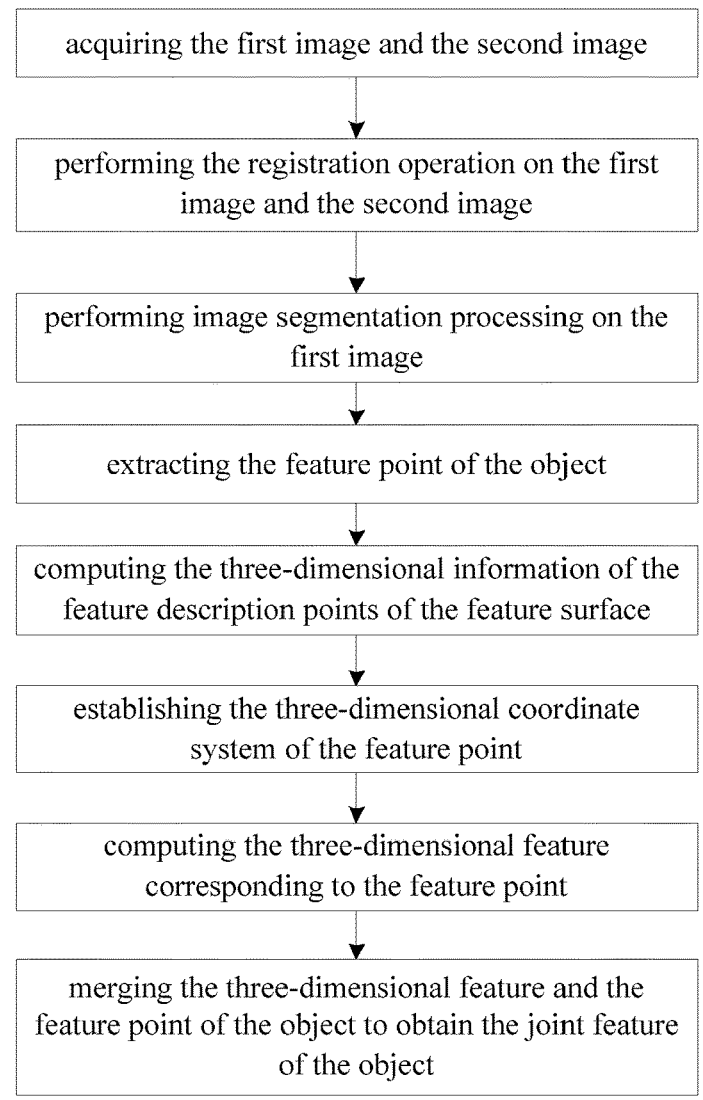
FIG. 4 is a schematic flow chart of a method for acquiring a joint feature provided by an embodiment of the present disclosure.

FIG. 4 is a schematic flow chart of a method for acquiring a joint feature provided by an embodiment of the present disclosure. For example, as shown in FIG. 4, a method for acquiring the joint feature may include: firstly, acquiring the first image and the second image, the second image being the depth image; then, performing the registration operation on the first image and the second image to obtain the registration information between the first image and the second image, the registration information including the depth information of the second image; then, performing image segmentation processing on the first image to obtain the target region of the first image; then, extracting the feature point of the object based on the target region of the first image; then, determining the feature surface of the object according to the feature point, and computing the three-dimensional information of the feature description points of the feature surface based on the registration information (including depth information of the feature surface); then, establishing the three-dimensional coordinate system of the feature point based on the three-dimensional information of the feature description points and the feature point; next, computing the three-dimensional feature corresponding to the feature point according to the three-dimensional coordinate system of the feature point; and finally, merging the three-dimensional feature and the feature point of the object to obtain the joint feature of the object.

For example, the step S13 shown in FIG. 1 may include: using a classifier to compute, based on the joint feature, a plurality of scores when the object belongs to different categories; and determining a recognition result of the object according to the plurality of scores.

For example, the classifier may include a support vector machine (SVM) classifier, a SoftMax classifier, a K-Nearest Neighbor (KNN) classifier, and the like. For example, when the classifier is a SoftMax classifier, the SoftMax classifier has a plurality of category symbols, the plurality of scores are a plurality of prediction probabilities, and the plurality of prediction probabilities correspond to the plurality of category symbols. Magnitudes of absolute values of the plurality of prediction probabilities represent magnitudes of probabilities when the object belongs to different categories. The recognition result of the object is a category corresponding to a maximum prediction probability among the plurality of prediction probabilities.

For example, in some embodiments, the automatic object recognition method may further comprise: outputting the recognition result of the object.

For example, the recognition result of the object may be displayed on a display, or may also be output by means of voice through a loudspeaker, and the like.

For example, the automatic object recognition method may further comprise: outputting related information of the object. When the automatic object recognition method is applied to a supermarket automatic checkout system, the related information may include price information, country of origin information, and the like.

Figure 5:
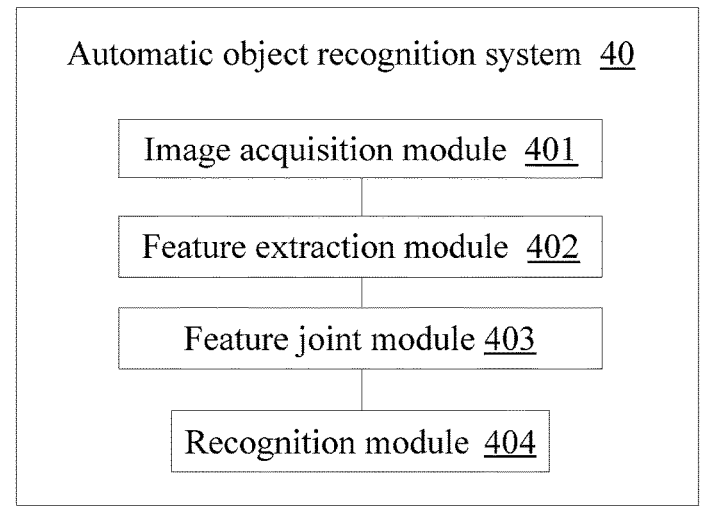
FIG. 5 is a schematic block diagram of an automatic object recognition system provided by an embodiment of the present disclosure.

FIG. 5 is a schematic block diagram of an automatic object recognition system provided by an embodiment of the present disclosure. For example, as shown in FIG. 5, an automatic object recognition system 40 may comprise an image acquisition module 401, a feature extraction module 402, a feature joint module 403, and a recognition module 404. It should be noted that, the components of the automatic object recognition system shown in FIG. 5 are merely exemplary and not limitative, and according to actual application requirements, the automatic object recognition system 40 may further have other components.

For example, the image acquisition module 401 is configured to acquire a first image and a second image, both the first image and the second image including a same object, and the second image being a depth image. The feature extraction module 402 is configured to extract a feature point of the object based on the first image: the feature joint module 403 is configured to obtain a joint feature based on the feature point from the first image and depth information of the second image; and the recognition module 404 is configured to recognize the object based on the joint feature.

For example, the image acquisition module 401 may comprise a depth camera.

For example, specifically, the feature extraction module 402 may be configured to acquire a target region of the first image, the target region including the object; and extract the feature point of the object within the target region.

For example, specifically, the feature joint module 403 may be configured to compute a three-dimensional feature corresponding to the feature point based on the feature point and the depth information of the second image; and merge the three-dimensional feature and the feature point to obtain the joint feature.

For example, specifically, the recognition module 404 may be configured to use a classifier to compute, based on the joint feature, a plurality of scores when the object belongs to different categories; and determine a recognition result of the object according to the plurality of scores.

It should be noted that, for a specific operation performed by the image acquisition module 401, reference may be made to related description of step S10 in the embodiments of the above-described automatic object recognition method; for a specific operation performed by the feature extraction module 402, related description of step S11 in the embodiments of the above-described automatic object recognition method may be referred to; for a specific operation performed by the feature joint module 403, related description of step S12 in the embodiments of the above-described automatic object recognition method may be referred to; for a specific operation performed by the recognition module 404, related description of step S13 in the embodiments of the above-described automatic object recognition method may be referred to; and repeated part will not be described here.

For example, the image acquisition module 401, the feature extraction module 402, the feature joint module 403 and the recognition module 404 may be interconnected by a bus system, a network, and/or other forms of connection mechanism (not shown). For example, the network may comprise a wireless network, a wired network, and/or any combination of the wireless network and the wired network.

For example, in some embodiments of the present disclosure, the feature extraction module 402, the feature joint module 403 and the recognition module 404 may include codes and programs stored in a memory; a processor may execute the codes and the programs to implement some or all functions of the feature extraction module 402, the feature joint module 403 and the recognition module 404 as described above.

For example, the automatic object recognition system 40 may further comprise an output module (not shown). The output module is configured to output the recognition result of the object. The output module may further be configured to output related information of the object, and the like.

For example, the output module may include a display, a loudspeaker, etc., to output the recognition result of the object.

Figure 6:
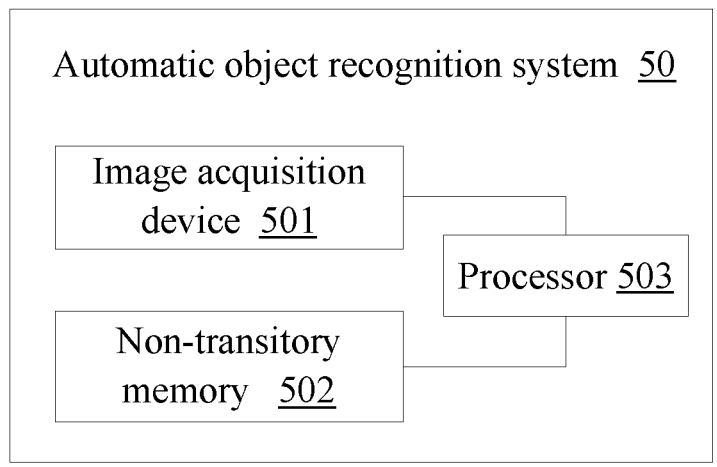
FIG. 6 is a schematic block diagram of another automatic object recognition system provided by an embodiment of the present disclosure.

FIG. 6 is a schematic block diagram of another automatic object recognition system provided by an embodiment of the present disclosure.

An embodiment of the present disclosure further provides an automatic object recognition system. For example, as shown in FIG. 6, the automatic object recognition system 50 may comprise an image acquisition device 501, a non-transitory memory 502 and a processor 503. It should be noted that, the components of the automatic object recognition system shown in FIG. 6 are merely exemplary and not limitative, and according to actual application requirements, the automatic object recognition system 50 may further have other components.

For example, the image acquisition device 501 is configured to acquire a first image and a second image of an object. The non-transitory memory 502 is configured to store computer readable instructions. The processor 503 is configured to execute the computer readable instructions. For example, when the computer readable instructions are executed by the processor 503, one or more steps in the automatic object recognition method according to any one of the above-described embodiments are performed.

For example, the image acquisition device 501 may include a depth camera, and thus, the image acquisition device 501 may acquire a depth image, for example, the second image is a depth image.

For example, the image acquisition device 501, the non-transitory memory 502, and the processor 503 may be interconnected by a bus system, a network, and/or other forms of connection mechanism (not shown). The network may include a wireless network, a wired network, and/or any combination of the wireless network and the wired network.

For example, components such as the image acquisition device 501, the non-transitory memory 502 and the processor 503 can communicate with one another directly or indirectly.

For example, the processor 503 may be a central processing unit (CPU) or other forms of processing unit having data processing capabilities and/or program execution capabilities, such as a field-programmable gate array (FPGA), or a tensor processing unit (TPU). The processor 503 may control other components in the automatic object recognition system 50 to perform desired functions. For another example, the central processing unit (CPU) may be an X86, ARM architecture, or the like.

For example, the non-transitory memory 502 may comprise an arbitrary combination of one or more computer program products. The computer program products may comprise various forms of computer-readable storage media, such as volatile memory and/or non-volatile memory. The volatile memory may comprise, for example, a random access memory (RAM) and/or a cache or the like. The non-volatile memory may comprise, for example, a read only memory (ROM), a hard disk, an erasable programmable read only memory (EPROM), a portable compact disc-read only memory (CD-ROM), a USB memory, a flash memory, and the like. One or more computer instructions may be stored on the non-transitory memory 502, and the processor 503 may execute the computer instructions to implement various functions. Various applications, various data, various data used and/or generated by the applications, and the like, may also be stored in the computer-readable storage medium.

It should be noted that, for detailed descriptions of a recognition process of the automatic object recognition method, related description in the embodiments of the automatic object recognition method may be referred to; and repeated part will not be described here.

For example, in some embodiments, the automatic object recognition system 50 may further comprise a communication device, a power-supply module, and other components. The power-supply module is configured to provide a stable power source to respective components in the automatic object recognition system 50; the power-supply module may be an external direct-current or alternating-current power source, or may be a battery, such as a primary battery or a secondary battery. The communication device is configured to provide communication signals, such as wireless signals and/or wired signals, to respective components in the automatic object recognition system 50.

For example, in some embodiments, according to actual application requirements, the automatic object recognition system 50 may further comprise an output device (not shown), and the like. The output device may be configured to output a recognition result of an object. The output device may further be configured to output related information of the object, and the like.

For example, the output device may be a display, a projector, and the like, to display the recognition result of the object, the related information of the object, and the like. The display may be a liquid crystal display (LCD), an organic light-emitting diode display (OLED), and the like.

For example, the output device may also include a loudspeaker, and the like, to output the recognition result, the related information of the object, and the like, by means of voice.

Figure 7:
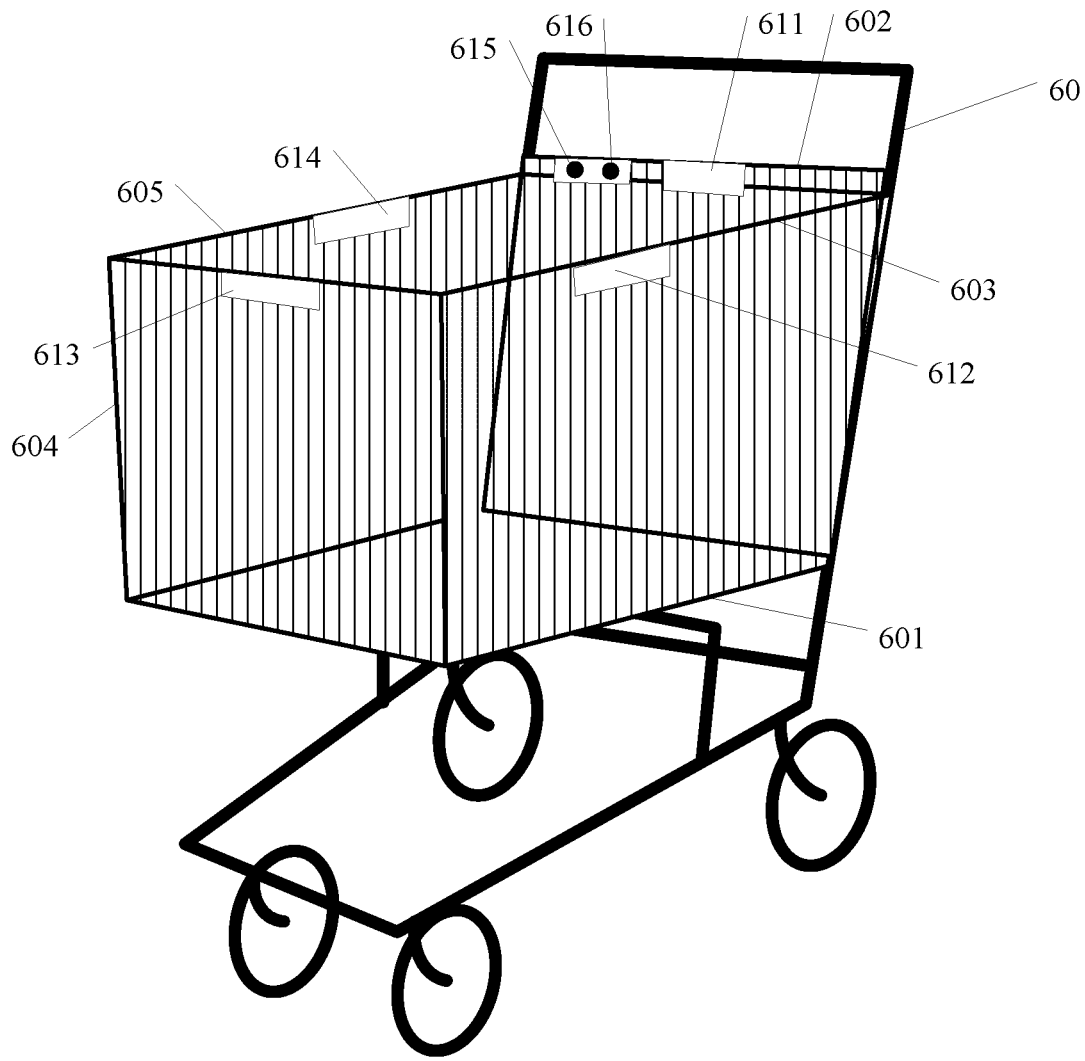
FIG. 7 is a schematic diagram of a shopping device provided by an embodiment of the present disclosure.

An embodiment of the present disclosure further provides a shopping device. FIG. 7 is a schematic diagram of a shopping device provided by an embodiment of the present disclosure. For example, as shown in FIG. 7, the shopping device may comprise a shopping cart. The shopping cart may include a car body 60 and the automatic object recognition system according to any one of the above-described embodiments. Of course, the shopping device may also include a shopping basket, a shopping bag, a shopping checkout device, or other shopping devices, and the present disclosure is not limited thereto.

For example, the automatic object recognition system may be provided on the car body 60.

For example, as shown in FIG. 7, the cart body 60 includes a loading region, and an object to be categorized can be placed in the loading region. The loading region has a certain accommodation space. The loading region may include a bottom surface 601 and four lateral surfaces, and the four lateral surfaces are respectively a first lateral surface 602, a second lateral surface 603, a third lateral surface 604 and a fourth lateral surface 605. The first lateral surface 602 and the third lateral surface 604 are opposite to each other, and the second lateral surface 603 and the fourth lateral surface 605 are opposite to each other.

For example, the automatic object recognition system comprises at least one image acquisition device. As shown in FIG. 7, the automatic object recognition system comprises four image acquisition devices, and the four image acquisition devices are respectively a first image acquisition device 611, a second image acquisition device 612, a third image acquisition device 613 and a fourth image acquisition device 614. For example, the first image acquisition device 611 is disposed on a side of the first lateral surface 602 close to the third lateral surface 604, the second image acquisition device 612 is disposed on a side of the second lateral surface 603 close to the fourth lateral surface 605, the third image acquisition device 613 is disposed on a side of the third lateral surface 604 close to the first lateral surface 602, and the fourth image acquisition device 614 is disposed on a side of the fourth lateral surface 605 close to the second lateral surface 603. The four image acquisition devices may acquire first images and second images of the object from different shooting angles, so as to acquire more detailed shape information of the object, thereby improving recognition accuracy.

For example, the automatic object recognition system further comprises a non-transitory memory 615 and a processor 616. For example, the non-transitory memory 615 and the processor 616 may be integrated together, and are disposed on one lateral surface of the cart body 601 or on the bottom surface 601 of the cart body 60.

For example, the shopping cart may be a herringbone shopping cart, an America shopping cart, a plastic shopping cart, and the like.

For example, in one specific example, two commodities are placed in the shopping cart, one of the two commodities is a stereo model having respective symmetrical lateral surfaces, and the other of the two commodities is a planar poster of the stereo model. Recognizing the stereo model may include: acquiring a first image of the stereo model and a second image of the stereo model; then, extracting a feature point of the stereo model based on the first image of the stereo model; then, obtaining a joint feature of the stereo model based on the feature point from the first image of the stereo model and depth information of the second image of the stereo model; and finally, recognizing the stereo model based on the joint feature of the stereo model.

Recognizing the planar poster of the stereo model may include: acquiring a first image of the planar poster of the stereo model and a second image of the planar poster of the stereo model; then, extracting a feature point of the planar poster of the stereo model based on the first image of the planar poster of the stereo model; then, obtaining a joint feature of the planar poster of the stereo model based on the feature point from the first image of the planar poster of the stereo model and depth information of the second image of the planar poster of the stereo model; and finally, recognizing the planar poster of the stereo model based on the joint feature of the planar poster of the stereo model. For example, the stereo model includes at least a first portion and a second portion, a distance between the first portion and the image acquisition device is different from a distance between the second portion and the image acquisition device. When the two commodities (i.e., the stereo model and the planar poster of the stereo model) are recognized by using the automatic object recognition method provided by the embodiment of the present disclosure, on the second image of the stereo model, a region corresponding to the first portion of the stereo model and a region corresponding to the second portion of the stereo model have different depth information; while on the second image of the planar poster of the stereo model, depth information in respective regions is the same, and thus, the stereo model may be distinguished from the planar poster of the stereo model.

Figure 8:
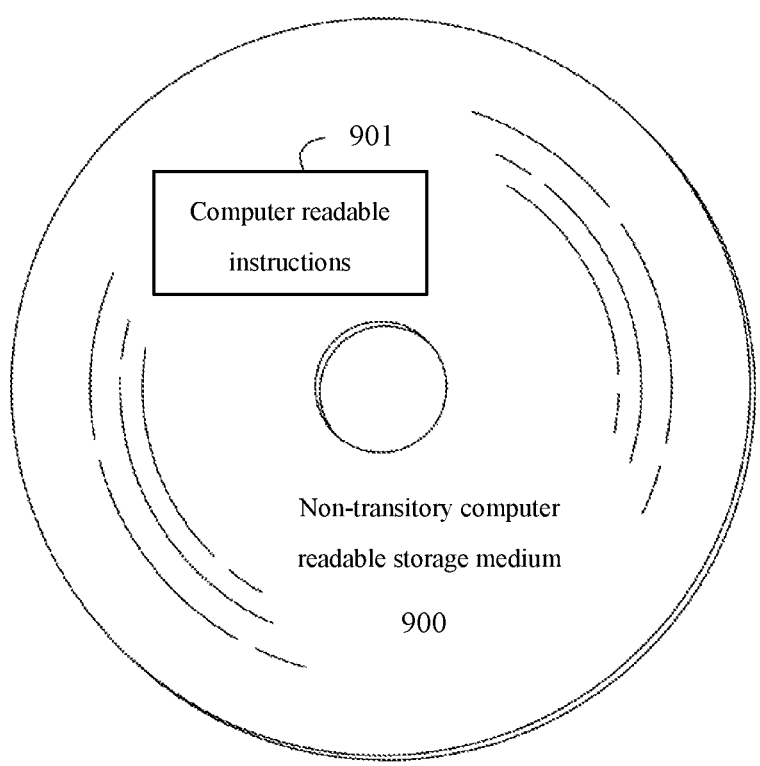
FIG. 8 is a schematic diagram of a non-transitory computer readable storage medium provided by an embodiment of the present disclosure.

An embodiment of the present disclosure further provides a non-transitory computer readable storage medium. FIG. 8 is a schematic diagram of a non-transitory computer readable storage medium provided by an embodiment of the present disclosure. For example, the non-transitory computer readable storage medium may be used for storing computer readable instructions. As shown in FIG. 8, one or more computer readable instructions 901 may be stored on a non-transitory computer readable storage medium 900. For example, when the computer readable instructions 901 are executed by a computer, one or more steps in the automatic object recognition method according to any one of the above-described embodiments may be performed.

For example, the non-transitory computer readable storage medium 900 may be applied to the above-described automatic object recognition system. For example, the non-transitory computer readable storage medium 900 may be the non-transitory memory 502 of the automatic object recognition system according to the embodiment shown in FIG. 6.

For example, for descriptions of the non-transitory computer readable storage medium 900, descriptions about the non-transitory memory 502 in the embodiment of the automatic object recognition system 200 shown in FIG. 6 may be referred to, and repeated part will not be described here.

For the present disclosure, the following statements should be noted:

(1) the accompanying drawings of the embodiment(s) of the present disclosure involve only the structure(s) in connection with the embodiment(s) of the present disclosure, and other structure(s) can be referred to common design(s); and (2) in case of no conflict, the embodiments of the present disclosure and the features in the embodiment(s) can be combined with each other to obtain new embodiment(s).

What have been described above are only specific implementations of the present disclosure, the protection scope of the present disclosure is not limited thereto, and the protection scope of the present disclosure should be based on the protection scope of the claims.

What is claimed is:

1. An automatic object recognition method, comprising:
   acquiring a first image and a second image, both the first image and the second image comprising a same object, and the second image being a depth image;
   extracting a feature point of the object based on the first image;
   obtaining a joint feature based on the feature point from the first image and depth information of the second image; and
   recognizing the object based on the joint feature,
   wherein obtaining the joint feature based on the feature point from the first image and depth information of the second image includes
      computing a three-dimensional feature corresponding to the feature point based on the feature point and the depth information of the second image, and
      merging the three-dimensional feature and the feature point to obtain the joint feature;
   wherein computing the three-dimensional feature corresponding to the feature point based on the feature point and the depth information of the second image includes
      establishing a three-dimensional coordinate system of the feature point based on the feature point and the depth information of the second image, and computing the three-dimensional feature corresponding to the feature point according to the three-dimensional coordinate system of the feature point; and wherein establishing the three-dimensional coordinate system of the feature point based on the feature point and the depth information of the second image includes
performing a registration operation on the first image and the second image to obtain registration information between the first image and the second image, the registration information including the depth information of the second image,
determining a feature surface of the object according to the feature point,
computing three-dimensional information of feature description points of the feature surface based on the registration information, and
establishing the three-dimensional coordinate system of the feature point based on the three-dimensional information of the feature description points and the feature point.

2. The automatic object recognition method according to claim 1, wherein extracting the feature point of the object based on the first image comprises:
acquiring a target region of the first image, the target region comprising the object; and
extracting the feature point of the object within the target region.

3. The automatic object recognition method according to claim 2, wherein acquiring the target region of the first image comprises:
performing image segmentation processing on the first image to obtain the target region of the first image; or
performing image segmentation processing on the second image to obtain a depth target region of the second image, performing a registration operation on the first image and the second image to obtain registration information between the first image and the second image, and obtaining the target region of the first image based on the registration information and the depth target region.

4. The automatic object recognition method according to claim 1, wherein establishing the three-dimensional coordinate system of the feature point based on the three-dimensional information of the feature description points and the feature point comprises:
computing a normal vector at the feature point according to the three-dimensional information of the feature description points, a direction of the normal vector being taken as a first-axis direction of the three-dimensional coordinate system; and
obtaining, according to the normal vector, a tangent plane at the feature point and principal directions of two principal curvatures of the feature point on the tangent plane, the principal directions of the two principal curvatures being perpendicular to each other, and the principal directions of the two principal curvatures being respectively taken as a second-axis direction and a third-axis direction of the three-dimensional coordinate system.

5. The automatic object recognition method according to claim 1, wherein computing the three-dimensional feature corresponding to the feature point according to the three-dimensional coordinate system of the feature point comprises:

computing coordinates of the feature description points of the feature surface in the three-dimensional coordinate system; and
computing the three-dimensional feature corresponding to the feature point according to a coordinate of the feature point in the three-dimensional coordinate system and the coordinates of the feature description points in the three-dimensional coordinate system.

6. The automatic object recognition method according to claim 1, wherein merging the three-dimensional feature and the feature point to obtain the joint feature comprises:
merging a dimension of the three-dimensional feature and a dimension of the feature point to obtain the joint feature.

7. The automatic object recognition method according to claim 1, wherein recognizing the object based on the joint feature comprises:
using a classifier to compute, based on the joint feature, a plurality of scores when the object belongs to different categories; and
determining a recognition result of the object according to the plurality of scores.

8. The automatic object recognition method according to claim 7, further comprising:
outputting the recognition result of the object.

9. The automatic object recognition method according to claim 1, wherein the first image is a color image.

10. An automatic object recognition system, comprising:
an image acquisition module, configured to acquire a first image and a second image, both the first image and the second image comprising a same object, and the second image being a depth image;
a feature extraction module, configured to extract a feature point of the object based on the first image;
a feature joint module, configured to obtain a joint feature based on the feature point from the first image and depth information of the second image; and
a recognition module, configured to recognize the object based on the joint feature;
wherein the feature joint module is further configured to compute a three-dimensional feature corresponding to the feature point based on the feature point and the depth information of the second image, and merge the three-dimensional feature and the feature point to obtain the joint feature;
the feature joint module is further configured to establish a three-dimensional coordinate system of the feature point based on the feature point and the depth information of the second image, and compute the three-dimensional feature corresponding to the feature point according to the three-dimensional coordinate system of the feature point; and
the feature joint module is further configured to perform a registration operation on the first image and the second image to obtain registration information between the first image and the second image, the registration information including the depth information of the second image, determine a feature surface of the object according to the feature point, compute three-dimensional information of feature description points of the feature surface based on the registration information, and establish the three-dimensional coordinate system of the feature point based on the three-dimensional information of the feature description points and the feature point.

11. The automatic object recognition system according to claim 10, wherein an operation of extracting the feature point of the object based on the first image comprises:
acquiring a target region of the first image, the target region comprising the object; and
extracting the feature point of the object within the target region.

12. The automatic object recognition system according to claim 10, wherein an operation of obtaining the joint feature based on the feature point from the first image and depth information of the second image comprises:
computing a three-dimensional feature corresponding to the feature point based on the feature point and the depth information of the second image; and
merging the three-dimensional feature and the feature point to obtain the joint feature.

13. An automatic object recognition system, comprising:
an image acquisition device, configured to acquire a first image and a second image, both the first image and the second image comprising a same object, and the second image being a depth image;
a non-transitory memory, configured to store computer readable instructions; and
a processor, configured to execute the computer readable instructions, wherein when the computer readable instructions are executed by the processor, the processor performs:
acquiring a first image and a second image, both the first image and the second image comprising a same object, and the second image being a depth image;
extracting a feature point of the object based on the first image;
obtaining a joint feature based on the feature point from the first image and depth information of the second image; and
recognizing the object based on the joint feature,
wherein obtaining the joint feature based on the feature point from the first image and depth information of the second image includes
computing a three-dimensional feature corresponding to the feature point based on the feature point and the depth information of the second image, and
merging the three-dimensional feature and the feature point to obtain the joint feature;
wherein computing the three-dimensional feature corresponding to the feature point based on the feature point and the depth information of the second image includes
establishing a three-dimensional coordinate system of the feature point based on the feature point and the depth information of the second image, and
computing the three-dimensional feature corresponding to the feature point according to the three-dimensional coordinate system of the feature point;
wherein establishing the three-dimensional coordinate system of the feature point based on the feature point and the depth information of the second image includes
performing a registration operation on the first image and the second image to obtain registration information between the first image and the second image, the registration information including the depth information of the second image,
determining a feature surface of the object according to the feature point,
computing three-dimensional information of feature description points of the feature surface based on the registration information, and
establishing the three-dimensional coordinate system of the feature point based on the three-dimensional information of the feature description points and the feature point.

14. The automatic object recognition system according to claim 13, wherein the image acquisition device comprises a depth camera.

15. The automatic object recognition system according to claim 13, further comprising an output device,
wherein the output device is configured to output a recognition result of the object.

16. A shopping device, comprising a loading region and the automatic object recognition system according to claim 13,
wherein the automatic object recognition system is provided on the loading region.

17. A non-transitory computer readable storage medium, for storing computer readable instructions,
wherein when the computer readable instructions are executed by a computer, the computer performs the automatic object recognition method according to claim 1.

* * * * *